United States Patent [19]

Caffin et al.

[11] Patent Number: 4,937,712
[45] Date of Patent: Jun. 26, 1990

[54] VEHICULAR TURN SIGNAL APPARATUS

[76] Inventors: Frank H. Caffin; Neale L. Caffin, both of P.O. Box 8, Cabot, Vt. 05647

[21] Appl. No.: 395,707

[22] Filed: Aug. 7, 1989

[51] Int. Cl.$^5$ .............................................. B60Q 1/26
[52] U.S. Cl. .................................... 362/80.1; 362/287; 362/372
[58] Field of Search ................. 362/61, 80, 80.1, 282, 362/287, 372, 374, 375, 812; 340/475

[56] References Cited

U.S. PATENT DOCUMENTS

| | | | |
|---|---|---|---|
| 2,017,798 | 10/1935 | Gillespie | 362/80.1 |
| 3,432,808 | 3/1969 | Fleece | 362/80.1 X |
| 4,488,141 | 12/1984 | Ohlenforst et al. | 362/80.1 |

Primary Examiner—Stephen F. Husar
Attorney, Agent, or Firm—Leon Gilden

[57] ABSTRACT

A vehicular turn signal apparatus is provided for securement to a rear shelf surface proximate a rear window of a vehicular interior, wherein the vehicular turn signal apparatus includes a plurality of modules each containing a pivotally mounted bulb positionable from a first vertical position to a second horizontal position to enhance replacement of the illumination bulb upon an upward pivotment of a lid pivotally mounted to the base of the module.

6 Claims, 1 Drawing Sheet

U.S. Patent
Jun. 26, 1990
4,937,712
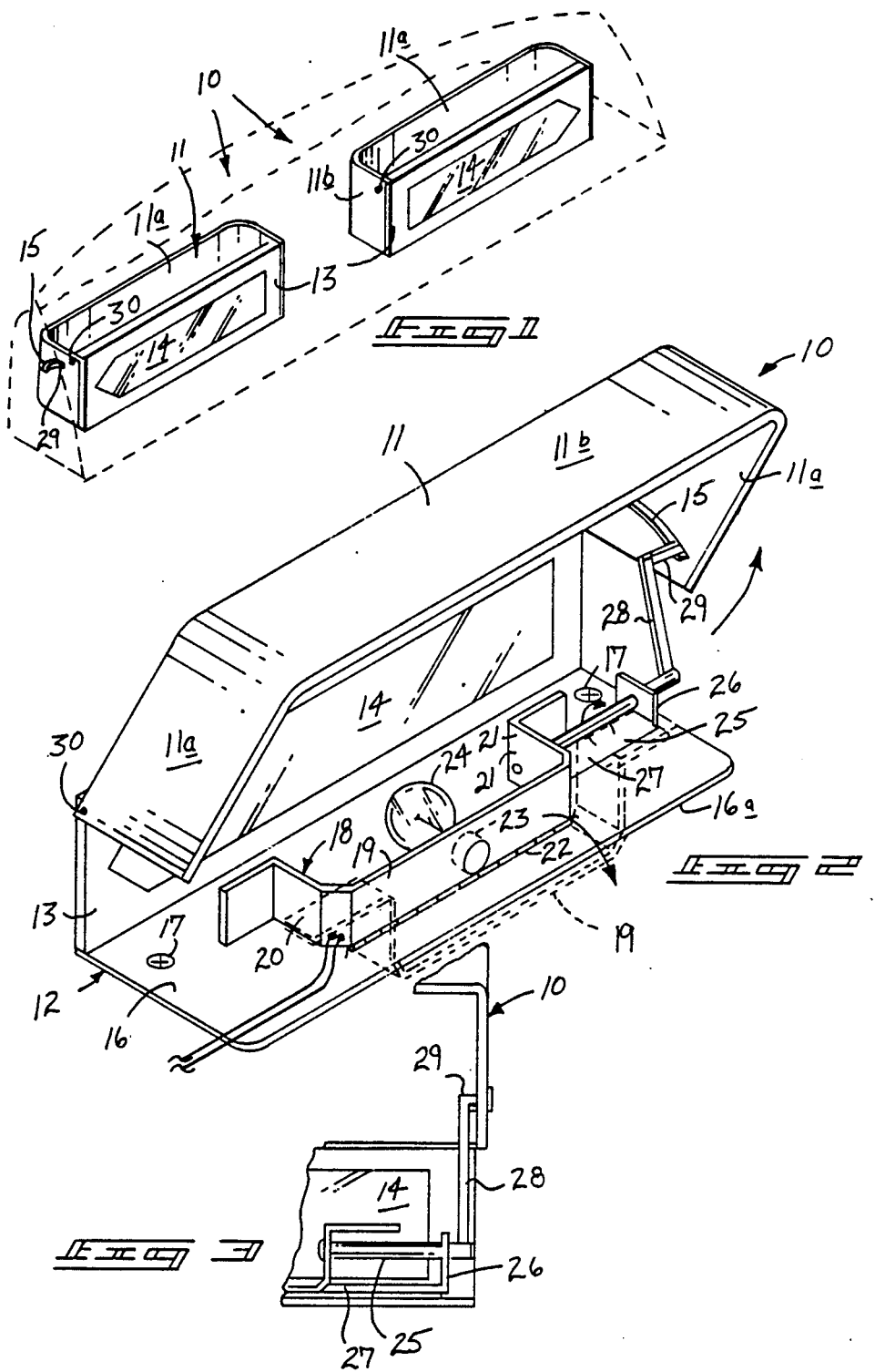

VEHICULAR TURN SIGNAL APPARATUS

BACKGROUND OF THE INVENTION

1. Field of the Invention

The field of invention relates to vehicular turn signal apparatus, and more particular pertains to a new and improved vehicular turn signal apparatus for securement to a rear shelf of a vehicular interior compartment.

2. Description of the Prior Art

The use of turn signal apparatus in vehicular environments is well known in the prior art. Examples may be found in U.S. Pat. No. 2,431,129 to Livingston illustrative of a turn signal device for use in association with motor vehicles wherein a housing with an indicator arro is provided for indication or direction of a turn for a vehicle.

U.S. Pat. No. 2,547,192 to Zentner sets forth right and left turn signal modules provided with interior illumination for indication of direction of a turn.

U.S. Pat. No. 3,518,624 to Smith illustrates a unitary housing for indication of direction of turn, stopping, and rearward motion of an associated vehicle.

U.S. Pat. No. 3,432,808 to Fleece illustrates turn signal module for securement to a rear shelf of a vehicular interior for indication of the turning orientation.

U.S. Pat. No. 4,495,553 to Haynes illustrates a turn signal light with a translucent lens of an arrow shaped configuration for securement to a conventional circular lens housing.

As such, it may be appreciated that there is a continuing need for a new and improved vehicular turn signal apparatus wherein the same provides for a module to indicate direction of turn of an associated automotive vehicle, as well as providing ease of replacement of an associated illumination bulb contained therewithin.

SUMMARY OF THE INVENTION

In view of the foregoing disadvantages inherent in the known types of vehicular turn signal apparatus now present in the prior art, the present invention provides a vehicular turn signal apparatus wherein the same provides for direction of turn as well as enhanced ease of replacement of an illumination bulb within a confined rear shelf portion of a vehicular interior. As such, the general purpose of the present invention, which will be described subsequently in greater detail, is to provide a new and improved vehicular turn signal apparatus which has all the advantages of the prior art vehicular turn signal apparatus and none of the disadvantages.

To attain this, the present invention includes a plurality of housing modules, each containing an indicator translucent panel on a forward wall of a base member of each housing with a lid pivotally mounted to the base member. The lid includes an arcuate slot providing a "lost motion" to an included axle slidingly captured within the slot, wherein the axle is secured by way of a link to a further axle that is pivotally mounted to a spring biased reflector member. The reflector member, upon opening of the lid, is pivoted from a first vertical position to a second horizontal position for ease of replacement of an associated bulb therewithin.

My invention resides not in any one of these features per se, but rather in the particular combination of all of them herein disclosed and claimed and i& is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular turn signal apparatus which has all the advantages of the prior art vehicular turn signal apparatus and none of the disadvantages.

It is another object of the present invention to provide a new and improved vehicular turn signal apparatus which may be easily and efficiently manufactured and marketed.

It is a further object of the present invention to provide a new and improved vehicular turn signal apparatus which is of a durable and reliable construction.

An even further object of the present invention is to provide a new and improved vehicular turn signal apparatus which is susceptible of a low cost of manufacture with regard to both materials and labor, and which accordingly is then susceptible of low prices of sale to the consuming public, thereby making such vehicular turn signal apparatus economically available to the buying public.

Still yet another object of the present invention is to provide a new and improved vehicular turn signal apparatus which provides in the apparatuses and methods of the prior art some of the advantages thereof, while simultaneously overcoming some of the disadvantages normally associated therewith.

Still another object of the present invention is to provide a new and improved vehicular turn signal apparatus wherein the same is arranged for mounting on a rear shelf of a vehicular interior environment and further includes a pivotally mounted reflector structurally oriented with a pivoted lid for horizontal repositioning of the reflector for ease of changing of a bulb positioned therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention in an opened orientation.

FIG. 3 is an orthographic view of the instant invention illustrating the linkage utilized therewithin.

DESCRIPTION OF THE PREFERRED EMBODIMENT

With reference now to the drawings, and in particular to FIGS. 1 to 3 thereof, a new and improved vehicular turn signal apparatus embodying the principles and concepts of the present invention and generally designated by the reference numeral 10 will be described.

More specifically, the vehicular turn signal apparatus 10 essentially comprises a plurality of modular housings, illustrated in FIG. 1, each indicating a respective right and left turn signal by use of a forwardly mounted translucent indicator panel 14 Each module housing includes a lid 11 pivotally mounted to an underlying "L" shaped base member 12 by means of aligned pivot lid axles 30 oriented to mount respective right and left side walls 11c to the edges of the vertical wall 13 of the base member 12. The lid 11 further includes a top wall 11a and a rear wall 11b. A right side wall 11c of each module includes an arcuate "lost motion" slot 15 directed therethrough.

The base member 12 includes a horizontal floor 16 utilizing fastener members 17 to secure the floor and the associated module to a vehicular rear window shelf "V" proximate a rear window of an automotive vehicle. A "U" shaped reflector 18 is pivotally mounted to the floor 16 and includes a rear reflector wall is with a left "L" shaped reflector leg 20 and a right "L" shaped reflector leg 21 directed forwardly of the rear reflector wall 19. A spring hinge 22 biases the "U" shaped reflector 18 in a normally orthogonal relationship relative to the floor 16 of the base member 12. A light socket 23 is oriented orthogonally through the rear reflector wall 19 and is directed forwardly thereof and is mounted flush with a rear surface of the rear wall in a coplanar relationship to avoid any protrusion when the "U" shaped reflector 18 is pivoted to a second position relative to the wall at approximately 90 degrees relative to the first position. An illumination bulb 24 is replaceable mounted within the light socket 23. A first axle 25 is rotatably mounted orthogonally through the right "L" shaped reflector leg 21 and is received within an adjacent alignment tab 26 rotatably &here&through that is integrally secured to the right "L" shaped reflector leg by use of an elongate brace 27 underlying the first axle 25. A link 28 is orthogonally and integrally secured to the axle 25 at an end remote from the right "L" shaped reflector leg 21 and is in turn orthogonally secured at its other end to a second axle 29. The second axle 29 is received through the arcuate "lost motion" slot 15. It may be appreciated as the lid 11 is pivoted upwardly from a closed orientation, as illustrated in FIG. 1, to a second position, as illustrated in FIG. 2, the second axle 29 is rotated and lifted as it approaches the lowermost end of the arcuate 15, as illustrated in FIG. 2, to pivot the "U" shaped reflector 18 to a second position at approximately 90 degrees relative to the first position as it is pivoted about the spring hinge 22. Also as illustrated in FIG. 2, the "U" shaped reflector 18 is of a predetermined height and is positioned relative to a rearward edge of the horizontal floor 16 a distance less than the predetermined height, such that upon rotation of the "U" shaped reflector 18 to its second position, access to the illumination bulb 24 is readily available, particularly in a rear window shelf environment of an automotive vehicle where the rear window is typically at an acute angle relative to the rear shelf of the vehicle and where access to maintenance of a turn signal apparatus is eased by the rotation of the reflector, as illustrated. The electrical wires are also directed through the left reflector leg 20 to avoid any impediments upon a rear surface of the rear reflector wall kg in a second position.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicular turn signal apparatus for securement to a vehicular rear shelf adjacent a rear window, said apparatus comprising, a plurality of housings each including a base member and a lid pivotally mounted to the base member, and a translucent indicator panel integrally formed on a forward wall of each base member, and illumination means pivotally mounted onto a floor of the base member for access thereto upon the lid pivoted from a first lowered position to a second raised position.

2. A vehicular turn signal apparatus as set forth in claim 1 wherein the illumination means includes a linkage means, wherein the linkage means is pivotally mounted to the illumination means and the lid for pivoting of the illumination means from a vertical position to a second horizontal position when the lid is raised from a first lowered position to a second raised position.

3. A vehicular turn signal apparatus as set forth in claim 2 wherein the illumination means includes a generally "U" shaped reflector with a rear wall integrally secured to forwardly directed respective left and right legs, and the linkage means include a first axle orthogonally and pivotally mounted through a right leg directed outwardly of the right leg and pivotally mounted orthogonally to a tab member, the tab member integrally secured to the right leg, and further including a link orthogonally secured to a remote end of the first axle spaced from the tab and the right leg, and the link integrally secured to a second axle, the second axle directed through an opening formed in the lid.

4. A vehicular turn signal apparatus as set forth in claim 3 wherein the opening formed in the lid is defined as an arcuate slot, and the second axle is directed through the slot.

5. A vehicular turn signal apparatus as set forth in claim 4 wherein the illumination means further includes a light bulb socket, the light bulb socket directed forwardly of the "U" shaped member, and a plurality of conductive electrical wires directed through the left leg of the "U" shaped reflector, and wherein the rear reflector wall of the "U" shaped reflector defines a planar surface on a rear surface of &he rear wall to eliminate obstruction upon pivotment of the "U" shaped reflector from the first to the second position.

6. A vehicular turn signal apparatus as set forth in claim 5 wherein the base member is of an "L" shaped configuration and wherein the lid is pivotally mounted to the vertical wall of the base member adjacent upper terminal ends thereof.

* * * * *